United States Patent [19]

Lang et al.

[11] Patent Number: 5,201,605

[45] Date of Patent: Apr. 13, 1993

[54] POSITIVELY CLOSING NOZZLE AND METHOD OF USE IN UNDERGROUND IRRIGATION

[76] Inventors: Robert J. Lang, 5663 Encina Rd., #102, Goleta, Calif. 93117; Thomas W. Morgan, 318 Gainsborough Rd., Thousand Oaks, Calif. 91360

[21] Appl. No.: 795,065

[22] Filed: Nov. 20, 1991

[51] Int. Cl.⁵ .................................. E02B 13/00
[52] U.S. Cl. .................................. 405/37; 405/36; 137/78.3; 239/453
[58] Field of Search .............. 405/39, 40, 36, 37; 137/78.3; 239/453, 460

[56] References Cited

U.S. PATENT DOCUMENTS

| | | |
|---|---|---|
| 1,758,119 | 5/1930 | Le Moon . |
| 1,893,707 | 1/1933 | Karshner ........................ 111/7.1 |
| 1,991,930 | 2/1935 | Hope ........................ 405/40 X |
| 2,083,153 | 6/1937 | Irish ........................ 405/39 X |
| 2,263,197 | 11/1941 | Tabb et al. . |
| 2,554,409 | 5/1951 | Holder . |
| 2,790,403 | 4/1957 | Larsen ........................ 405/40 X |
| 2,960,831 | 11/1960 | Lonaberger et al. ............. 111/7.1 X |
| 2,990,123 | 6/1961 | Hyde . |
| 3,397,541 | 8/1968 | Kersh . |
| 3,685,735 | 8/1972 | Foster . |
| 3,742,701 | 7/1973 | Feemster et al. . |
| 3,974,853 | 8/1976 | Bentley . |
| 4,958,771 | 9/1990 | Klomp ........................ 239/453 |

FOREIGN PATENT DOCUMENTS 104953  6/1924  Switzerland .................. 111/7.1

Primary Examiner—Dennis L. Taylor
Attorney, Agent, or Firm—John A. Bucher

[57] ABSTRACT

A positively closing nozzle and method of its use in underground irrigation wherein the nozzle is elongated with inlet means at one end and positively closing means at the other end opened by water pressure applied to the nozzle, one or more nozzle being arranged underground in a selected pattern for irrigating plants or the like, the valve being operated by water pressure for producing a circumferential flow pattern of irrigation, the flow pattern being adjustable either by means of a spring-load or flow emitter means in the nozzle.

16 Claims, 3 Drawing Sheets

POSITIVELY CLOSING NOZZLE AND METHOD OF USE IN UNDERGROUND IRRIGATION

FIELD OF THE INVENTION

The present invention relates to a method and apparatus for irrigation and more particularly to a nozzle constructed for use in underground irrigation.

BACKGROUND OF THE INVENTION

Traditional irrigation systems employed for wide varieties of plants have relied upon flooding techniques or sprinklers. Irrigation systems employing such sprinklers commonly include one or more nozzles arranged above ground towards hand operating under relatively high pressure. The nozzles are designed to spray relatively finely divided droplets water into the air. The nozzles are arranged as necessary in order to provide coverage for the plants requiring irrigation.

A nozzle of the type referred to immediately above was disclosed for example in U.S. Pat. No. 1,758,119 issued May 13, 1932, to Le Moone. That reference is representative of a wide variety of such high pressure nozzles employed as sprinklers.

More recently, so-called "drip irrigation" techniques have been employed in irrigation systems. These drip irrigation systems operate under relatively low water pressure and include emitters for emitting or dripping water directly onto the ground. Accordingly, these drip emitters have commonly been arranged closely adjacent each of the plants to be irrigated. Drip irrigation systems have been found superior in that less water need be applied to an area to be irrigated. At the same time, these systems include numerous other advantages such as avoiding undesirable run-off.

A drip irrigation valve or emitter of the type discussed immediately above was disclosed for example in U.S. Pat. No. 3,974,853 issued Aug. 17, 1976 to Bentley. Here again, this patent is typical of a wide variety of emitters employed in drip irrigation systems. Such an emitter was also disclosed for example in U.S. Pat. No. 3,685,735 issued Aug. 22, 1972 to Foster.

In view of numerous advantages such as those set forth above, drip irrigation systems have become widely employed as a superior means for irrigation in a wide variety of applications including agricultural corps, ornamental gardens, etc.

However, in view of the time necessary to install, employ and operate such irrigation systems, as well as the need to minimize water requirements while achieving superior results in the form of higher crop yield, improved plant characteristics and the like, there has been found to remain a need for even further improvements in such irrigation systems.

SUMMARY OF THE INVENTION

The present invention is based upon the concept of underground irrigation. In such a system, an irrigation system includes nozzles which may also be termed emitters or valves but which are necessarily placed underground in order to provide an underground supply of water, preferably closely adjacent to feeder roots for the plants. It is to be understood that, as with other prior art irrigation systems, the underground irrigation systems of the present invention may be employed not only to supply water but also to supply plant nutrients, systemic materials, etc.

Underground irrigation techniques contemplated by the present invention are believed to be superior for purposes of enhancing plant growth and even further minimizing water requirements. At least in theory, as noted above, it is believed that underground irrigation provides water and other additives directly to the plant roots in order to result in superior plant growth. At the same time, with the water being released underground, there is less likelihood of water loss, for example, from evaporation which typically resulted from prior art sprinkler systems where the water was finally divided in the air and even in drip irrigation systems where the water was deposited upon the earth and thus exposed to the air, at least for a period of time necessary for the water to seep into the ground.

As noted above, the comments set forth immediately above are not set forth for purposes of limiting the invention but merely in an attempt to explain possible benefits for underground irrigation systems. It is also noted that the underground irrigation system of the present invention may be employed with water sources of different operating pressures. However, it is preferably contemplated to provide an underground irrigation system capable of operation with a water source of relatively low pressure, typically 50 psi or even less. Such pressures are typical of many water supplies and, in addition, the use of a relatively low pressure system further minimizes the possibility of undesirable ruptures or the like occurring within the irrigation system. The typical pressure of 50 psi is set forth only by way of example and, again, it is to be noted that this is not a limitation of the invention. Generally, it is contemplated that the underground irrigation system of the present invention may be employed with operating pressure ranging from very low levels corresponding to prior drip irrigation systems to substantially higher pressure providing for relatively substantial water flow from the underground nozzles.

In any event, it is an object of the invention to provide a method and apparatus for underground irrigation in order to achieve numerous advantages as set forth above and also to avoid one or more limitations of the prior art as previously discussed.

It is an even further object of the invention to provide such a method and apparatus based on the use of nozzles to be installed underground, the nozzles including means for releasing water to the underground location in response to water pressure in a system, the nozzle further including means for positively closing the nozzle in the absence of such water pressure in order to prevent earth or other contaminants from entering the nozzle, for example in response to vacuum conditions in the system, the earth or contaminants otherwise being capable of interfering with subsequent operation of the nozzles in the underground irrigation system.

It is a still further object of the invention to provide a positively closing nozzle for connection in single or multiple arrays within a water line in an underground irrigation system, the nozzle including an elongated housing with inlet means at one end and outlet means at its other end forming a circumferential outlet, a resilient valve means being movably mounted in the housing and including means tending to positively close the outlet means of the housing, the resilient valve means also including means responsive to water pressure within the housing in order to allow water to flow outwardly through the circumferentially arranged outlet means.

It is also a more specific object of the invention to provide such an underground irrigation nozzle comprising a cylindrical housing having inlet means at one end, the inlet means preferably being an external fitting for connection to a water line, with the other end of the cylindrical housing being open, a spring-loaded valve member being interconnected with the housing means of a spring urging the valve member into positively closing engagement with the other end of the cylindrical housing, the valve member being moveable against its spring-load in order to form a circumferential opening in combination with the other open end of the housing.

Preferably, the underground irrigation nozzle as summarized above is provided with flow distributing emitter means for regulating or varying a circumferential flow pattern to be developed by the nozzle. Similarly, the nozzle of the present invention is preferably contemplated to include adjustable, replaceable or variable spring means also for the purpose of permitting adjustment if the circumferential flow pattern developed by the nozzle.

At the same time, it is an object of the invention to provide a method for forming and operating an underground irrigation system employing a positively closing nozzle of the type outlined above.

Additional objects and advantages of the invention are set forth in the following description having reference to the accompanying drawings.

DESCRIPTION OF THE PREFERRED EMBODIMENTS

Figure 1:
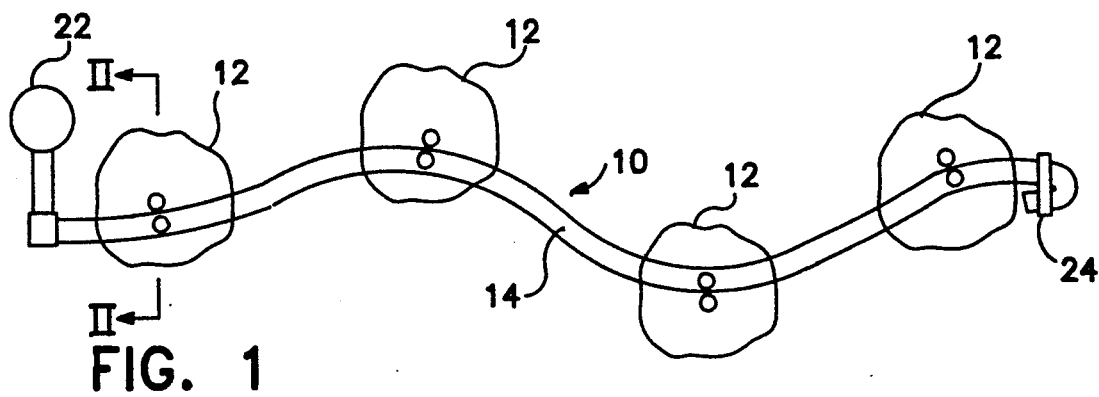
FIG. 1 is a plan view of a typical underground irrigation system according to the present invention.

Referring now to the drawings and particularly to FIG. 1, the invention contemplates an underground irrigation system as generally indicated at 10. The irrigation system 10 is contemplated for providing water, and possibly other additives such as nutrients, systemic treatments and the like, to one or more plants generally indicated at 12. The irrigation system 10 further includes a water line 14 which may be in the form of a hose, pipe or other conduit depending upon the application for the irrigation system.

Figure 2:
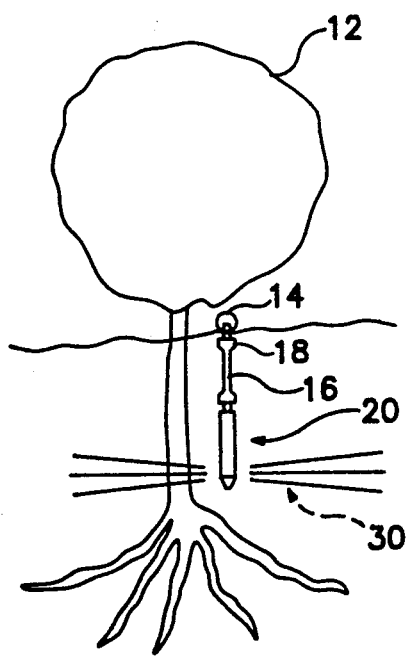
FIG. 2 is a fragmentary view taken along section line II—II in FIG. 1 in order to illustrate a single positively closing nozzle constructed according to the present invention and included within the underground irrigation system of FIG. 1 for irrigating one or more plants as illustrated.

Referring also to FIG. 2, the water line 14 is preferably provide with branched connections 16 for connecting the water line 14 or tubular extensions thereof, as indicated at 18, with one or more positive closure nozzles 20 constructed in accordance with the present invention.

Referring now again particularly to FIG. 1, the irrigation system 10 is provided with a source 22 of water under pressure for supplying the nozzle or nozzles 20 by means of the water line 14. In FIG. 1, the water line 14 is connected at one end to the water source 22. A close-off valve 24 is provided at the other end of the water line 14 for limiting flow within the water line 14 and to the various nozzles 20. It is to be understood that numerous variations are possible within the arrangement of an irrigation system 10 as contemplated for the present invention. For example, the system may be arranged with a single nozzle or nozzles adjacent each plant or group plants. The irrigation system 10 could also be provided, for example, with a plurality of nozzles arranged about the drip-line of one or more plants in order to supply water and possibly additives at the ends of feeder roots for the plants. In any event, it is to be understood that the irrigation system 10 of the FIG. 1 is set forth only by way of example and is not to be considered limiting for the invention.

Figure 3:
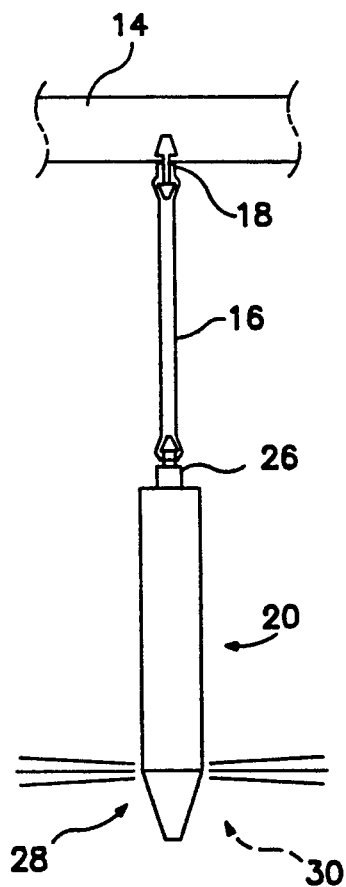
FIG. 3 is an enlarged fragmentary view of the positive closure nozzle of FIG. 2 arranged in an underground configuration and interconnected with a water line in a typical irrigation system.
Figure 7:
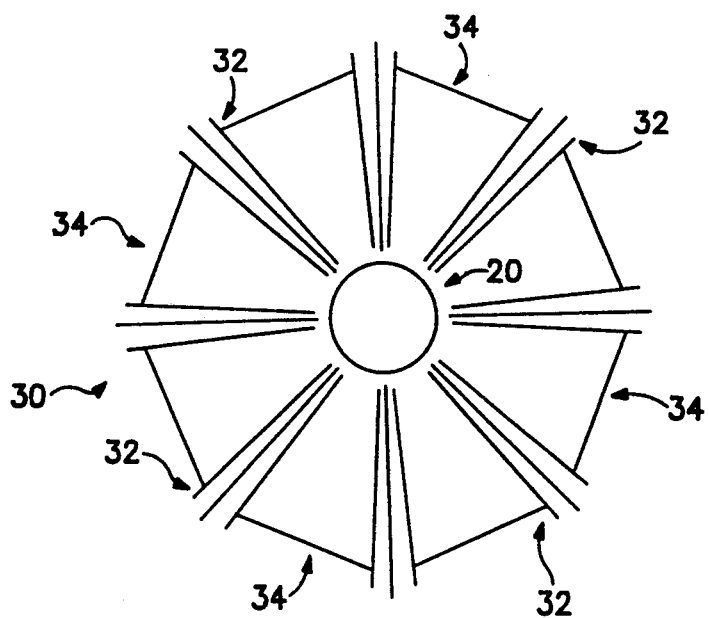
FIG. 7 is a generally pictorial representation, looking axially downward on nozzle of FIG. 6 in order to better illustrate the circumferential flow pattern.

Referring in particular to FIGS. 2 and 3, each nozzle 20 is generally elongated and an inlet 26, preferably in the form of an external fitting, at an upper end of the nozzle. An outlet means 28, as described in greater detail below, is arranged generally at the other or lower end of the nozzle 20. As noted above, the outlet means 28 is preferably positively closing in the absence of water pressure within the nozzle. However, the outlet means 28 also tends to open in response to water pressure developed within the nozzle for developing a circumferential pattern or distribution as generally indicated at 30. Referring particularly to FIG. 7, the flow pattern 30 is preferably contemplated as being generally uniform about its circumference. However, it is to be understood that the circumferential pattern 30 may be adjusted according to the present invention either in terms of flow intensity or about its entire circumference, generally to adapt the nozzle for use with different plants or applications, and also to adjustments which need not be necessarily uniform about its entire circumference. For example, continuing with reference to FIG. 7, the flow pattern 30 may be developed with concentrated spray or flow at one or more locations as indicated at 32. At the same time, the nozzle may be adapted for providing areas of relatively fine spray or flow in other regions indicated at 34. The manner in which such flow variations are developed is described in greater detail below.

Figure 4:
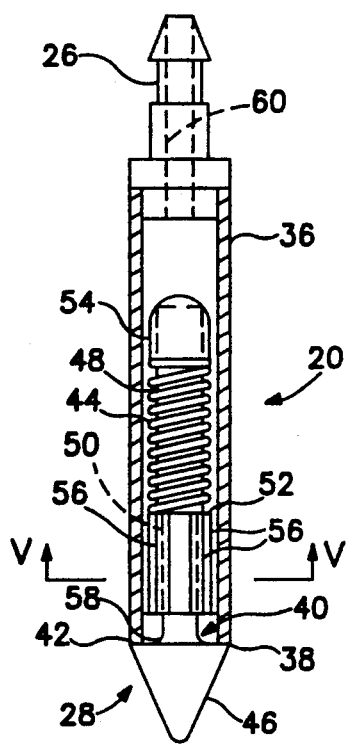
FIG. 4 is a longitudinal side view, with parts in section of one embodiment of a positive closure nozzle constructed according to the present invention.
Figure 5:
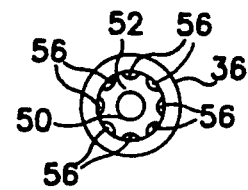
FIG. 5 is a view taken along section line V—V of FIG. 4.
Figure 6:
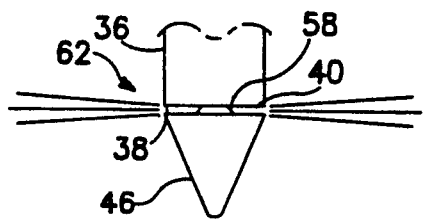
FIG. 6 is a fragmentary view of a lower end of the positive closure nozzle of FIG. 4 illustrated in an open position in response to water pressure within the nozzle in order to develop a circumferential flow pattern of water.

Referring now particularly to FIGS. 4–6, one embodiment 20 of a positive closure nozzle according to the present invention includes an elongated cylindrical housing 36. The housing 36 is formed with the inlet 26 at its upper end, the inlet 26 being an external, flange fitting of a type suitable for connection to a flexible hose such as the branched connections 16 of FIGS. 1-3.

The cylindrical housing 36 is open at its other end as indicated at 38 to form a circumferential outlet for the nozzle as described in greater detail below.

A valve member 40 is mounted in the open end of 38 of the cylindrical housing 36 and is formed with a cylindrical valve seat 42 arranged to mate with the open end 38 of the housing when the valve member 40 is forced into a closed position by its spring 44.

The valve member 40 is tapered or rounded as indicated at 46 beneath valve seat 42 in order to facilitate underground installations of the nozzle. It is generally contemplated that such installation includes prior formation of a hole or bore by means of a suitable tool (not shown). However, in some instances, such as where the surrounding earth is very loose, the nozzle could simply be forced into its underground position with the tapered end 46 serving to form the opening for receiving the nozzle.

The valve member 40 includes a stem or shaft 48 extending upwardly into the cylindrical housing 36. The shaft 48 preferably extends in moveable relation through a central opening 50 in a flow distributing emitter 52. The flow distributing emitter 52 is secured in fixed relation to the housing just above the open end 38 of the housing.

A spring retainer 54 is secured to an upper end of the shaft 48 with the spring 44 being of a compression type arranged for interaction between the flow distributing emitter 52 and the spring retainer 54.

Referring in combination to FIGS. 4 and 5, the emitter 52 is generally solid with a plurality of grooves 56 formed about its periphery. The grooves 56 are representative of flow distributing means provided the emitter 52 from regulating and establishing a flow pattern as represented at 30 in FIGS. 2, 3, 6 and 7.

It is to be understood that other configurations are possible for the emitter 52 in order to achieve different variations in the flow pattern 30. At the same time, it is also noted that variations in the flow pattern 30 may also be achieved by varying or adjusting the strength of the spring 44 and also by varying water pressure supplied to the nozzle 20. Variations in spring strengths either by adjustment or replacement of the spring, are primarily contemplated for adjusting flow intensity about the entire circumference of the flow pattern. Such variations may be provided, for example, in order to adapt the nozzle for use with different plants or in different applications. More specifically, it is of course contemplated that limited flow intensity may be more desirable for small plants such as garden flowers and the like with substantially greater intensity being desirable for large plants such as trees, agricultural crops and the like.

As illustrated in FIG. 5, the emitter 52 is formed with eight circumferentially spaced apart grooves 56 which tend to affect the flow pattern outwardly between the open end of the housing and the valve seat on the valve member. Referring also to FIG. 7, the concentrated regions of spray indicated at 32 conform generally with the locations of the grooves 56.

At the same time, the valve member 40 is also formed with a rounded fillet 58 at the intersection between the shaft 48 and the lower tapered portion 46 forming the valve seat 42. The fillet 58 also serves to regulate or adjust the flow pattern 30, primarily by providing a relatively smooth flow transition for water flow exiting downwardly from the emitter 52 and passing radially outwardly between the open end 38 of the housing and the valve seat 42.

As illustrated in FIG. 4, the valve member 40 is urged upwardly by its spring 44 so that the valve seat 42 is firmly engaged with the open end 38 of the housing. This corresponds to a positively close position for the nozzle, corresponding to the absence of substantial water pressure in the housing.

Upon introduction of water pressure into the housing, through a passage 60 extending from the inlet 26 into the interior of the housing, the water flows downwardly through the emitter 52 and acts upon the lower portion 46 of the valve 40 adjacent the valve seat 42 in order to shift the valve member 40 downwardly into the position illustrated in FIG. 6 in order to form a circumferential opening 62 between the open end 38 of the housing and the valve seat 42 as described above. This results in water flow from the nozzle in the form of the flow pattern 30 illustrated in FIGS. 6, 7 and elsewhere.

Figure 8:
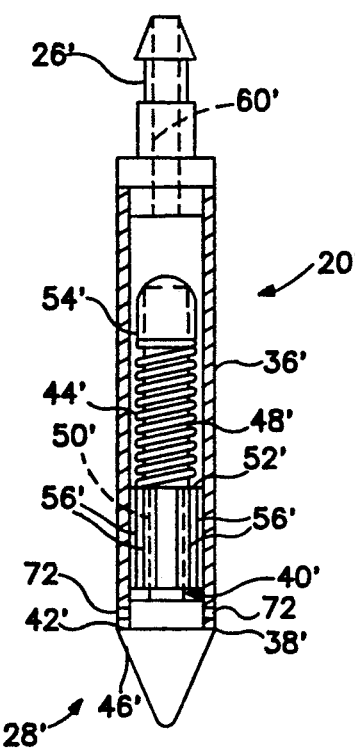
FIG. 8 is also longitudinal side view with parts in section, of another embodiment of a positive closure nozzle constructed according to the present invention.
Figure 8A:
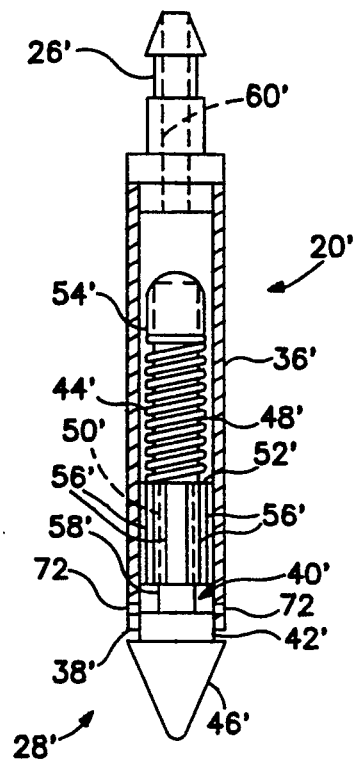
FIG. 8A is a similar view of the nozzle of FIG. 8 but with the nozzle in an open position in response to water pressure developed within the nozzle.

Another embodiment of a positive closure nozzle is illustrated at 20' in FIGS. 8 and 8A. Referring now to FIGS. 8 and 8A the nozzle 20' includes generally similar components as the nozzle 20 described in connection with FIGS. 4–6. Accordingly, similar primed numerals are employed to indicate corresponding elements. The nozzle 20' of FIGS. 8 and 8A is substantially similar in construction to the nozzle 20 except for the outlet means 28' formed at the lower end of the housing 36' and the configuration of the lower end of the valve member 40'.

More specifically, the outlet means 28 are formed as circumferentially spaced apart openings 72 in the housing 36' adjacent its open end 38'.

The valve seat 42' is formed as a radially outwardly facing recess surface mating with the inside diameter of the cylindrical housing 36'.

Thus, when the valve member 40' is urged upwardly by the spring 44' into a close position, the valve seat 42' overlaps the circumferential openings 72 in order to provide positive closure for the nozzle in the same manner described above.

However, when the valve member 40' is shifted downwardly against its spring by water pressure within the housing, the valve seat 42' is shifted below the circumferentially spaced apart openings 72 so that water flows outwardly through the openings in a flow pattern also determined by the emitter 52' and the fillet 58'.

Figure 9:
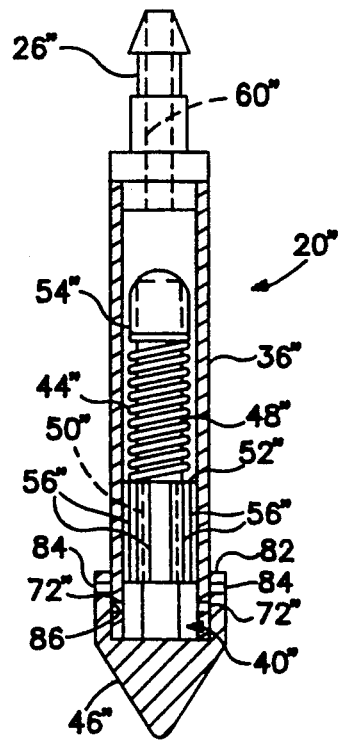
FIG. 9 is yet another longitudinal side view, with parts in section, of a further embodiment of a positive closure nozzle constructed according to the present invention.
Figure 9A:
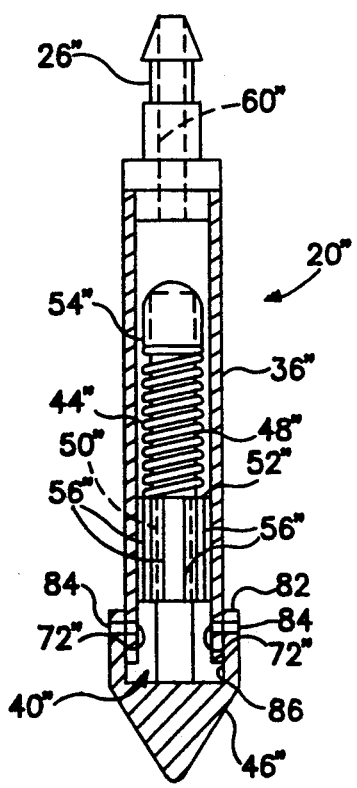
FIG. 9A is a similar view of the nozzle of FIG. 9 but with the nozzle also in an open position in response to water pressure developed therein.

Still another embodiment of a nozzle constructed according to the present invention is illustrated at 20" in FIGS. 9 and 9A.

In the embodiment of FIGS. 9 and 9A, corresponding elements of the nozzle 20 of FIG. 4 are similarly described with corresponding double primed numerals. The cylindrical housing 36" is again formed with the circumferentially spaced apart openings 72″ corresponding to those described above with reference to FIGS. 8 and 8A. The lower end 46″ of the valve member 40″ is formed with an external flange 82 generally mating with the outside diameter of the cylindrical housing 36″ and having circumferentially spaced apart openings 84. When the valve member is in a closed position as illustrated in FIG. 9, a lower solid portion 86 of the flange 82 provides a valve seat overlapping the circumferentially spaced apart opening 72″ and positively closing the nozzle 20″ in the same manner described above.

When the valve member 40″ is shifted downwardly by water pressure within the housing, the circumferentially spaced apart openings 84 on the flange are placed in register with the circumferentially spaced apart openings 72″ on the housing so that water flows outwardly from the housing through the combined openings 72″ and 84, again under regulation of the emitter 52″. Here again, the openings 72″ and 84 in both the housing and valve member may be varied or adjusted in order to further regulate the flow pattern provided by the nozzle 20″. It is further noted that the lower portion 46″ of the valve member could be formed as replaceable portion of valve member 40″ in order to permit even further adjustment or regulation of the flow pattern.

Figure 10:
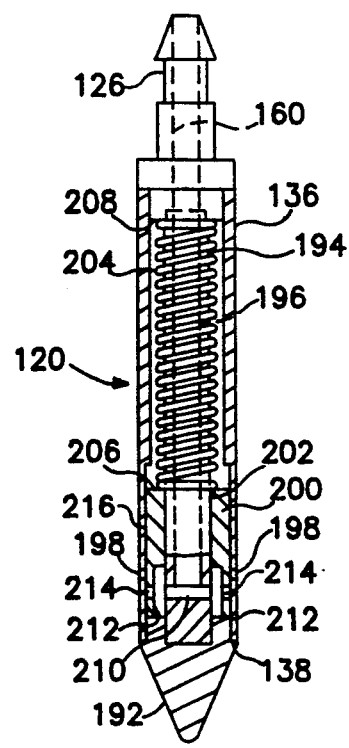
FIG. 10 is yet another longitudinal side of a further embodiment of a positive closure nozzle constructed according to the present invention.
Figure 10A:
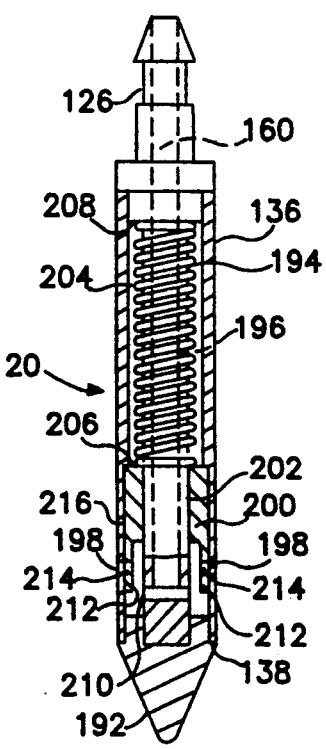
FIG. 10A is a similar view of the nozzle of FIG. 10 again with the nozzle in an open position in response to water pressure developed therein.

Another embodiment of a positive closure nozzle constructed according to the present invention is illustrated at 120 in FIGS. 10 and 10A. In this embodiment, the cylindrical housing 136 and the inlet 126 are generally similar to the housing 36 and inlet 26 of FIG. 4. However, the lower end 138 of the cylinder 136 is closed by a tapered member 192 secured in fixed relation to the housing 136. A shaft 194 extends upwardly from the lower portion 192 and includes a passage 196 communicating inlet means 126 with a lower end of the housing adjacent the closure 192.

Circumferentially arranged openings 198 are formed at the lower end of the housing 136.

A valve member 200 is movably positioned within the housing and includes a central bore 202 for receiving the shaft 194.

A compression spring 204 is arranged for interaction between an upper surface 206 of the valve member 200 and a surface 208 at the upper end of the housing.

A cross-drilled passage 210 is also formed at the lower end of the shaft 194 to allow water to flow outwardly from the passage 196.

A flow emitter 212 is integrally formed with the valve member 200 and defines circumferentially spaced apart openings 214.

In operation, when the valve member 200 is shifted downwardly by the spring 204, its outer circumferential surface provides a valve seat 216 closing off flow through the circumferentially arranged passages 198. When water pressure flows into the housing, it exits from the passage 196 through the cross passage 210, acting upwardly on the valve 200. The valve member 200 is thus shifted upwardly to the position illustrated in FIG. 10A so that the openings 214 in the emitter 212 are in register with the openings 198 in the cylindrical housing. In this manner, the nozzle 120 of FIGS. 10 and 10A is capable of producing a similar adjustable flow pattern as described above for the other embodiments.

Accordingly, there have been described a number of embodiments of positive closure nozzles for use in underground irrigation systems. Various modifications are believed obvious from the preceding description. Accordingly, the scope of the invention is defined only by the following appended claims which are further exemplary of the invention.

What is claimed is:

1. An underground irrigation nozzle, comprising
   a cylindrical housing having inlet means at one end for connection to a water source, the cylindrical housing being open at its other end,
   a spring-loaded valve member urged by its spring into positive closing engagement with the other end of the cylindrical housing, the valve member being movable against its spring-load to form a circumferential opening in combination with the other open end of the cylindrical housing, and
   a flow distributing emitter arranged within the housing adjacent its other end for developing a circumferential flow pattern when the valve member is in an open position.

2. The underground irrigation nozzle of claim 1 wherein the inlet means is an external fitting extending axially from the one end of the cylindrical housing for connection with a water line and wherein the valve member is tapered on its exposed end in order to better adapt the nozzle for underground installation.

3. The underground irrigation nozzle of claim 1 wherein the valve member is affixed to a shaft extending axially into the housing, and annular fillet being formed between the shaft and valve member for directing water radially outwardly when the valve member is in an open position.

4. The underground irrigation nozzle of claim 1 wherein the flow distributing emitter is secured to the housing, the valve member having a shaft extending movably through the emitter with a spring retainer at its end opposite the valve member, a compression spring being arranged for interaction between the spring retainer and the flow distributing emitter.

5. The underground irrigation nozzle of claim 1 wherein the outlet means comprises circumferentially arranged openings at the other end of the cylindrical housing, the valve member comprising a cylindrical portion for positively closing the circumferentially arranged openings when the valve member is urged by its spring-load into closing engagement with the cylindrical housing.

6. The underground irrigation nozzle of claim 4 wherein a portion of the valve member comprises the emitter means and is replaceable for adjusting circumferential flow of water from the nozzle.

7. The underground irrigation nozzle of claim 1 wherein the spring-load on the valve member is adjustable for regulated water flow from the nozzle.

8. A positively closing nozzle for connection in single or multiple arrays to a water line, comprising
   a housing having inlet means at one end for connection to the water line, the housing being elongated and adapted for underground installation with its other end being open and forming circumferential outlet means, and
   a resilient valve means movably mounted in the housing, the resilient valve means extending through the open end of the housing and forming seat means tending to positively mate with and close the outlet means of the housing, the resilient valve means also including means responsive to water pressure within the housing for moving the valve means into an open position in order to allow water flow outwardly through the circumferentially arranged outlet means whereby the outlet means either has water passing therethrough when open or is positively closed by mating engagement of the seat means with the outlet means to prevent contaminants from entering the nozzle when water is not flowing outwardly through the outlet means.

9. The positively closing nozzle of claim 8 wherein the inlet means is an external fitting extending axially from the one end of the housing for connection with a water line.

10. The positively closing nozzle of claim 9 further comprising a flow distributing emitter arranged within the housing adjacent its other end for developing a circumferential flow pattern when the valve means is in an open position.

11. A positively closing nozzle for connection in single or multiple arrays to a water line, comprising
a housing having inlet means at one end for connection to the water line, the housing being elongated and adapted for underground installation with its other end forming circumferential outlet means,
a resilient valve means movably mounted in the housing, the resilient valve means including means tending to positively close the outlet means of the housing, the resilient valve means also including means responsive to water pressure within the housing for moving the valve means in order to allow water flow outwardly through the circumferentially arranged outlet means,
a closure at the other end of the housing, and
means communicating the inlet with the other end of the housing,
the outlet means comprising a plurality of circumferentially arranged openings in the housing adjacent the closure, the resilient valve means being movably mounted within the housing and comprising a valve member and a spring means tending to urge the valve member toward the other end of the housing.

12. The positively closing nozzle of claim 11 further comprising a flow distributing emitter arranged within housing adjacent its other end for developing a circumferential flow pattern when the valve member is in an open position.

13. The positively closing nozzle of claim 12 wherein the flow distributing emitter is mounted on the valve member.

14. The positively closing nozzle of claim 11 wherein the spring means is adjustable for regulating water flow from the nozzle 15. The underground irrigation nozzle of claim 1 wherein the flow distributing emitter is formed with circumferentially spaced means for each directing concentrated flow in the circumferential flow pattern.

16. The underground irrigation nozzle of claim 10 wherein the flow distributing emitter is formed with circumferentially spaced means for each directing concentrated flow in the circumferential flow pattern.

* * * * *